United States Patent [19]

Isozaki

[11] Patent Number: 5,128,570
[45] Date of Patent: Jul. 7, 1992

[54] PERMANENT MAGNET TYPE STEPPING MOTOR

[75] Inventor: Kouki Isozaki, Kiryu, Japan

[73] Assignee: Japan Servo Co., Ltd., Tokyo, Japan

[21] Appl. No.: 719,499

[22] Filed: Jun. 24, 1991

[51] Int. Cl.$^5$ .................. H02K 37/10; H02K 1/12
[52] U.S. Cl. .................. 310/49 R; 310/180
[58] Field of Search .............. 310/49 R, 156, 179, 310/180, 162, 187; 318/685, 696

[56] References Cited

U.S. PATENT DOCUMENTS

| | | | |
|---|---|---|---|
| 2,931,929 | 4/1960 | Snowdon et al. | 310/156 |
| 3,148,319 | 9/1964 | Fredrickson | 318/166 |
| 3,206,623 | 9/1965 | Snowdon | 310/162 |
| 3,286,109 | 11/1966 | Madsen | 310/49 |
| 3,321,651 | 5/1967 | Madsen | 310/156 |
| 3,495,109 | 2/1970 | Ames | 310/71 |
| 3,535,604 | 10/1970 | Madsen et al. | 318/138 |
| 3,621,312 | 11/1971 | Palmero | 310/49 R |
| 3,842,332 | 10/1974 | Heine et al. | 318/696 |
| 3,866,104 | 2/1975 | Heine | 310/49 R |
| 4,029,977 | 6/1977 | Chai et al. | 310/49 R |
| 4,112,319 | 9/1978 | Field | 310/49 R |
| 4,675,564 | 6/1987 | Isozaki | 310/49 R |
| 4,983,867 | 1/1991 | Sakamoto | 310/49 R |

FOREIGN PATENT DOCUMENTS

| | | |
|---|---|---|
| 2254957 | 10/1990 | Japan . |
| 2269458 | 11/1990 | Japan . |
| 389840 | 4/1991 | Japan . |

Primary Examiner—Steven L. Stephan
Assistant Examiner—C. LaBalle
Attorney, Agent, or Firm—Oblon, Spivak, McClelland, Maier & Neustadt

[57] ABSTRACT

A permanent magnetic type stepping motor which is suitably used in such office automation machines and apparatuses and which parameters are set to satisfy the following conditions (1) to (4).

(1) The magnetic poles for the stator be 6 in number and be arranged as equally spaced by an identical pitch.

(2) Each of the magnetic poles of the stator be provided on its tip end with pole teeth which are equal in pitch to the pole teeth of the rotor magnetic poles or the pitch $\tau_S$ of the pole teeth of the stator magnetic poles and the pitch $\tau_R$ of the pole teeth of the rotor should satisfy the following correlations.

$$\tau_S = 180\tau_R/(180 \pm \tau_R)$$

$$60/\tau_S = m \text{ (where } m = 1, 2 \ldots \text{)}$$

(3) An angle $\sigma_r$ made between one of the stator magnetic poles and adjacent one of the rotor magnetic poles satisfy a relationship $\theta_r = 120°/Z$. The number of pole teeth in the rotor magnetic poles meet an equation $Z = 6n \pm 4$ (where n is a positive integer).

(4) The number of lead wires of the stepping motor be either one of 3, 6, 7 and 9.

2 Claims, 12 Drawing Sheets

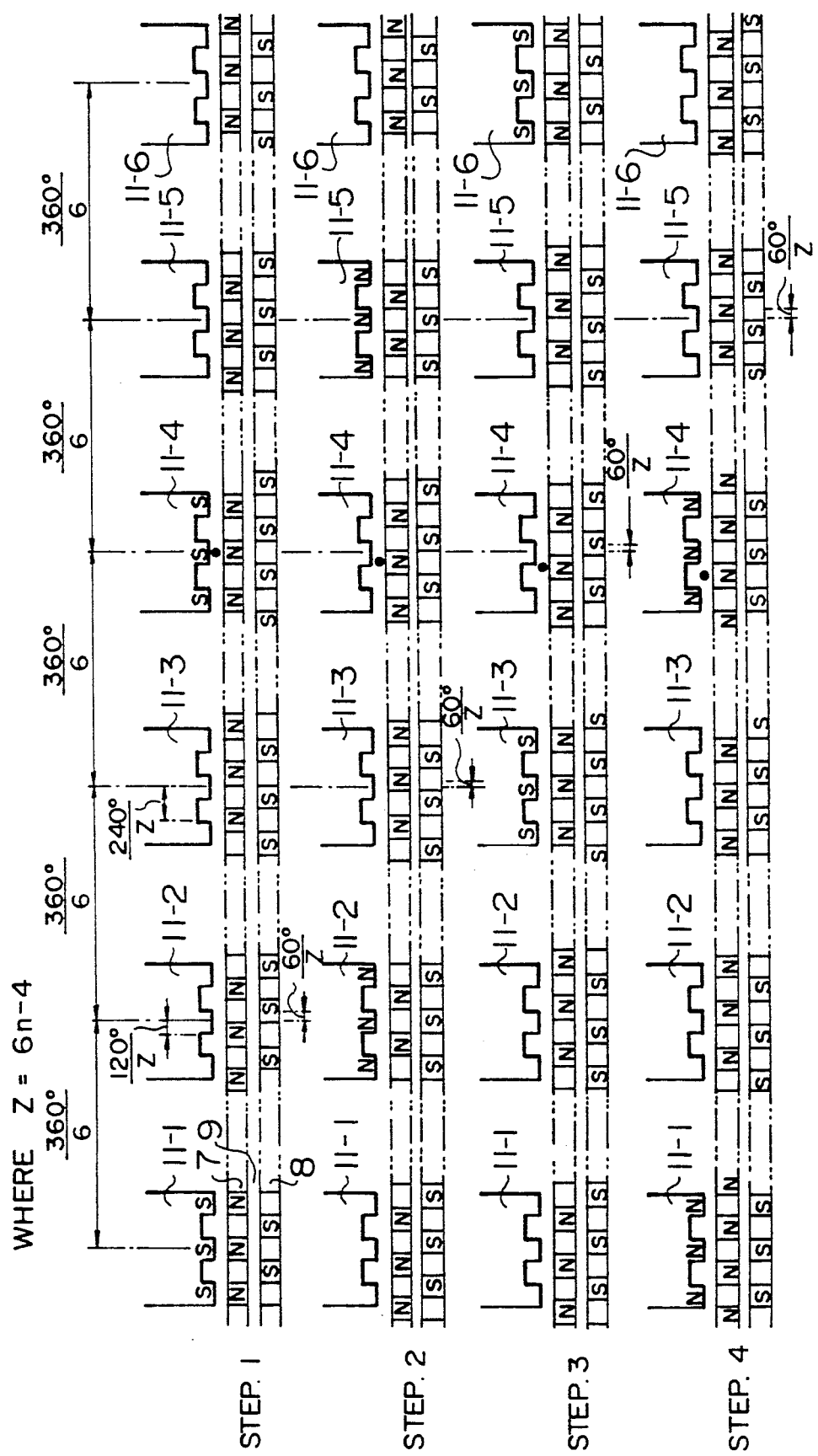

FIG. 6

| n | WHERE Z = 6n − 4 | | | WHERE Z = 6n + 4 | | |
|---|---|---|---|---|---|---|
| | Z | Qp | Qs | Z | Qp | Qs |
| 1 | 2 | 180° | 30° | 10 | 36° | 6° |
| 2 | 8 | 45° | 7.5° | 16 | 22.5° | 3.75° |
| 3 | 14 | 25.7142° | 4.285° | 22 | 16.3663° | 2.727° |
| 4 | 20 | 18° | 3.0° | 28 | 12.857° | 2.142° |
| 5 | 26 | 13.846° | 2.3076° | 34 | 10.588° | 1.764° |
| 6 | 32 | 11.25° | 1.875° | 40 | 9° | 1.5° |
| 7 | 38 | 9.4736° | 1.5789° | 46 | 7.826° | 1.304° |
| 8 | 44 | 8.1818° | 1.3636° | 52 | 6.923° | 1.1538° |
| 9 | 50 | 7.2° | 1.2° | 58 | 6.206° | 1.034° |
| 10 | 56 | 6.4285° | 1.0714° | 64 | 5.625° | 0.9375° |
| 11 | 62 | 5.806° | 0.9676° | 70 | 5.1428° | 0.8571° |
| 12 | 68 | 5.294° | 0.8823° | 76 | 4.7368° | 0.7894° |
| 13 | 74 | 4.8648° | 0.8108° | 82 | 4.370° | 0.7317° |
| 14 | 80 | 4.5° | 0.75° | 88 | 4.0909° | 0.6818° |
| 15 | 86 | 4.186° | 0.6976° | 74 | 3.8297° | 0.6382° |
| 16 | 92 | 3.913° | 0.6521° | 100 | 3.6° | 0.6° |
| ⋮ | ⋮ | ⋮ | ⋮ | ⋮ | ⋮ | ⋮ |

| STEP | DIRECTION OF CURRENT | 11-1 | 11-2 | 11-3 | 11-4 | 11-5 | 11-6 |
|---|---|---|---|---|---|---|---|
| ⑤ | V → W | N |   | S | N |   | S |
| ④ | V → U | S | N |   | S | N |   |
| ③ | W → U | S |   | N | S |   | N |
| ② | W → V |   | S | N |   | S | N |
| ① | U → V | N | S |   | N | S |   |
|   |   | MAGNETIC POLE (SALIENT POLE) | | | | | |

| STEP | DIRECTION OF CURRENT | 11-1 | 11-2 | 11-3 | 11-4 | 11-5 | 11-6 |
|---|---|---|---|---|---|---|---|
| ⑤ | U → V,W | N | S |   | N | S |   |
| ④ | V,U → W | N |   | S | N |   | S |
| ③ | V → U,W |   | N | S |   | N | S |
| ② | W,V → U | S | N |   | S | N |   |
| ① | W → V,U | S |   | N | S |   | N |
|   |   | \multicolumn{6}{MAGNETIC POLE (SALIENT POLE)} |

PERMANENT MAGNET TYPE STEPPING MOTOR

BACKGROUND OF THE INVENTION

1. Field of the Invention

The present invention relates to a permanent magnet type (hybrid type) stepping motor which is suitably used in such office automation machines and apparatuses as printers, high-speed facsimile machines and copying machines of plain paper copier (PPC) type.

2. Description of the Prior Art

Of prior art permanent type stepping motors, two-phase stepping motors have been predominantly used as taught, for example, in U.S. Pat. No. 4,675,564.

FIGS. 1A and 1B shows a structure of a two-phase, permanent type stepping motor shown in the above U.S. Patent.

In the drawing, the stepping motor includes a stator housing 1, a stator iron core 2, and a stator winding 3. The iron core 2 comprises magnetic poles 2-1 to 2-8 each having pole teeth 2-10 provided on its inner periphery. The stator winding 3 comprises windings 3-1 to 3-8 wound around the corresponding magnetic poles. The iron core 2 and the winding 3 make up a stator S.

The illustrated motor also includes end brackets 4 and 4, bearings 5 and 5, a rotor shaft 6, rotor magnetic poles 7 and 8, and a permanent magnet 9. The magnetic poles 7 and 8 are provided on its outer peripheries with pole teeth 7-10 and 8-10 respectively. These constituent members 6 to 9 make up a rotor R.

The two-phase, permanent magnet type stepping motor, however, has had problems ① to ④ as follows.

① The maximum number of lead wires is 4, but this motor requires at least 8 transistors in a driver circuit.

② The motor produces high torque ripples and thus much vibrations.

③ There are low cost motors using four poles, while motors for accurate use require at least eight poles.

④ In order to obtain a very small angle, many pole teeth as many as 100 or more must be provided on the rotor magnetic poles, which makes it difficult to form such pole teeth on the magnetic poles.

For the purpose of eliminating the above problems, a 5-phase, permanent magnet type stepping motor has been proposed. However, this stepping motor has had the following problems ① to ④. That is:

① The maximum number of lead wires is 5, but its driver circuit requires at least 10 transistors.

② The necessary number of magnetic poles is at least 10. Thus, this 5-phase motor becomes more costly than the 2-phase motor.

③ For the purpose of obtaining a very small angle, a stator must be constructed so as to be symmetrical with respect to a point. However, the stator of point symmetrical type brings about another problems, that is, corrective operation being widely used for offsetting blanking errors cannot be employed. In more detail, in an ordinary type motor, core laminates are stacked being shifted at a certain angle, e.g. 90 degrees, each time the core laminates have been stacked to have a predetermined thickness, so as to prevent the core blanking errors from being accumulated, however, the point symmetrical arrangement mentioned above does not permit such angular shifting during the stacking of core laminates. For this reason, it is impossible to accommodate the core blanking error.

④ Since the motor requires at least 10 magnetic poles, it is difficult to increase greatly the number of turns in a winding and thus it is impossible to obtain a sufficient torque.

SUMMARY OF THE INVENTION

It is an object of the present invention to provide a permanent magnet type stepping motor which can solve the above problems in the prior art.

In accordance with an aspect of the present invention, the above object is attained by providing a permanent magnet type stepping motor which comprises a stator having a plurality of radially-extending magnetic poles provided on its inner periphery, each of the plurality of magnetic poles being provided at its tip end with a plurality of pole teeth arranged being equally spaced by an identical pitch, the stator also having a plurality of windings wound around the plurality of corresponding magnetic poles and any of the two magnetic poles angularly shifted by 180 degrees are rendered to have the same polarity; two rotor magnetic poles disposed to be concentric with the stator as spaced by a gap from inside the stator and also provided on their full circumferential peripheries with a plurality of pole teeth which are equal or different in pitch to or from the pole teeth of the stator and shifted by ½ pitch from each other; and a rotor having a axially-magnetized permanent magnet held between the rotor magnetic poles.

Structural features of the permanent magnet type stepping motor according to the present invention are:

(1) The magnetic poles of the stator are set at 6 in number and arranged equally with an identical pitch.

(2) The pitch $T_s$ of the pole teeth provided at the tip ends of the respective magnetic poles of the stator is set to be equal to the pitch $T_R$ of the pole teeth of the rotor.

(3) An angle $\theta_r$ made between one of the pole teeth of the stator magnetic poles and one of the pole teeth of rotor magnetic poles opposed thereto is set to satisfy a relationship $\theta_r = 120°/Z$, said pole tooth number Z of the rotor magnetic poles is set to satisfy a relationship $Z = 6n \pm 4$ (where n is an positive integer).

(4) The motor is driven with 3, 6, 7 or 9 lead wires.

According to an alternative embodiment of the present invention, condition 2 above, may be replaced by condition 5 below. the following condition (5) may be added, as necessary to the stepping motor of the present invention.

(5) The pitch $\tau_s$ of the pole teeth of the stator magnetic poles and the high pitch $\tau_R$ of the pole teeth of the rotor should satisfy the following correlations.

$$\tau_s = 180\tau_R/(180 \pm \tau_R)$$

$$60/\tau_s = m \text{ (where } m = 1, 2, \ldots\text{)}$$

BRIEF DESCRIPTION OF THE DRAWINGS

FIG. 4 is a development for explaining how the rotor magnetic poles of the first embodiment of the present invention are shifted;

FIG. 6 is a diagram showing the relationship between pole teeth number Z, the pitch angle $\theta_P$ with respect to the adjacent magnetic poles of the rotor and step angle $\theta_s$;

DESCRIPTION OF THE PREFERRED EMBODIMENTS

Three preferred embodiments of the present invention will be explained, in detail, with reference to the accompanying drawings.

Figure 1A:
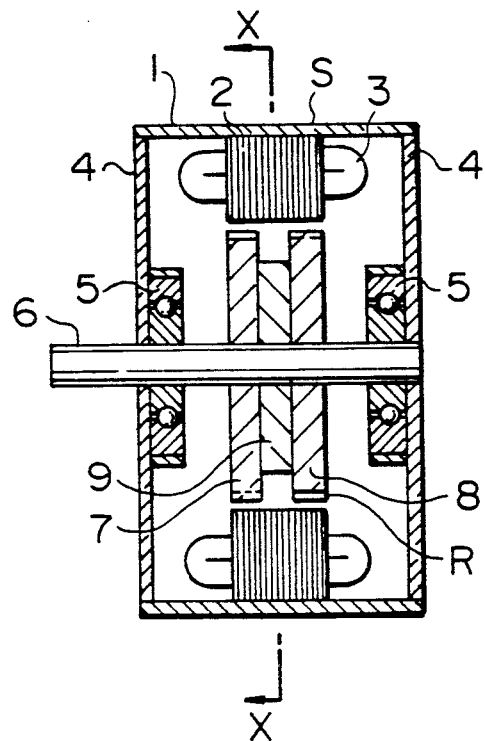
FIG. 1A is a longitudinal, elevational cross-sectional view of a prior art stepping motor.
Figure 1B:
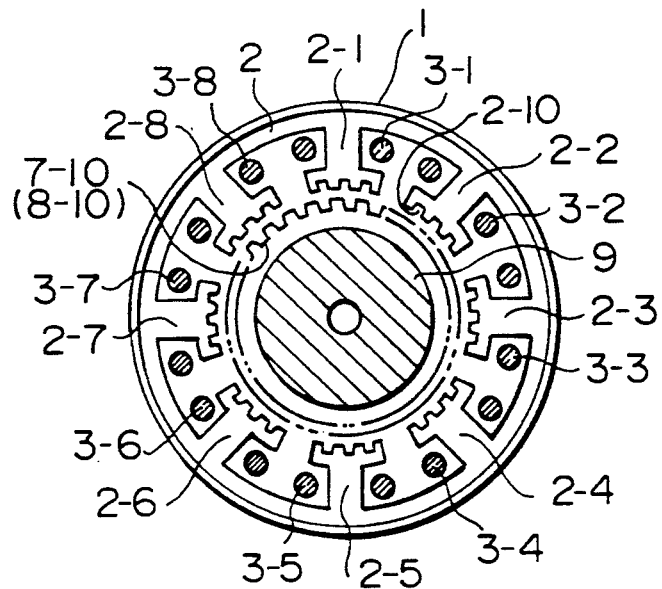
FIG. 1B is a cross-sectional view taken along line X—X in FIG. 1A.
Figure 2:
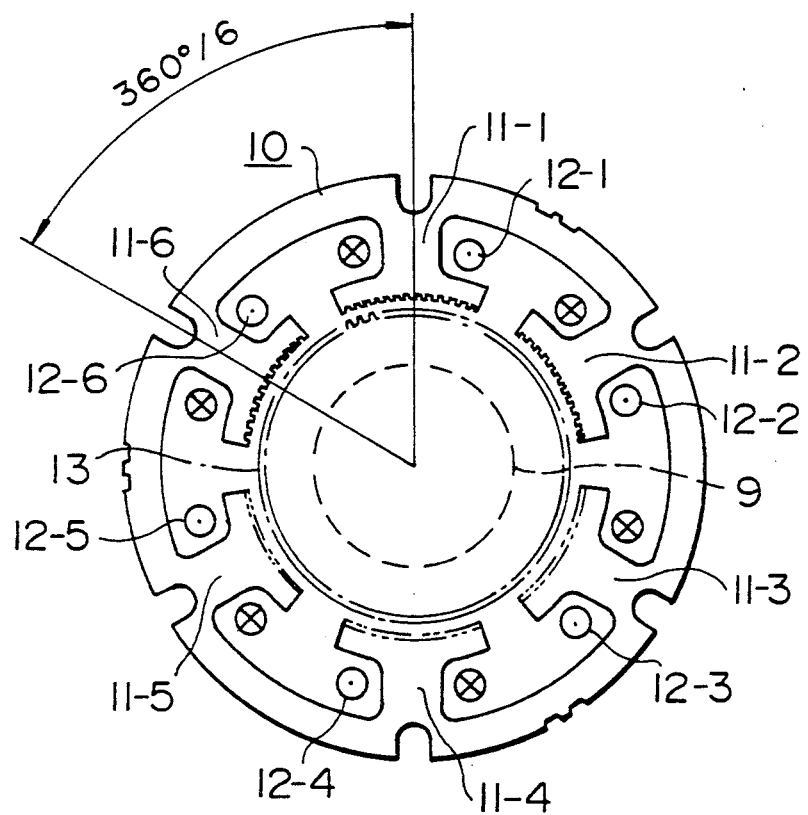
FIG. 2 is a plan view of a stator used in a stepping motor in accordance with a first embodiment of the present invention.

Referring first to FIG. 2, there is shown a plan view of a structure of a stator in a stepping motor in accordance with a first embodiment of the present invention.

In the drawing, a stator 10 comprises 6 stator magnetic poles 11-1 to 11-6 and windings 12-1 to 12-6 wound around the corresponding magnetic poles so that any of the two magnetic poles angularly shifted by 180 degrees are rendered to have the same polarity.

In this case, it is common practice to assemble the stator 10 by stacking a necessary number of stator iron core sheets in the same direction so that their pole tooth pitch can be overlapped with each other.

The same as in the prior art, a rotor comprises two magnetic poles provided on their outer peripheries with pole teeth and an N- and S-magnetized permanent magnet disposed between the magnetic poles, with the pitch of the pole teeth of one of the two magnetic poles shifted by ½ from the pitch of the pole teeth of the other.

With respect to the basic principle of the stepping motor of the present invention, the number Z of pole teeth provided on the rotor magnetic poles and other parameters are set to satisfy the following conditions (1) to (4) and/or (5).

(1) The magnetic poles for the stator should be 6 in number and be arranged to be equally spaced by an identical pitch.

The pitch ($\tau_s$) of the pole teeth provided at the tip ends of the respective magnetic poles of the stator is set equal to the pitch ($\tau_R$) of the pole teeth of the rotor.

(3) An angle $\theta_r$ made between one of the pole teeth of the stator magnetic poles and one of the pole teeth of the rotor magnetic poles opposing thereto should satisfy the following relationship.

$$\theta_r = 120°/Z \quad (1)$$

Further, the number of pole teeth in the rotor magnetic poles should meet the following equation.

$$Z = 6n \pm 4 \quad (2)$$

(4) The number of lead wires of the stepping motor should be one of 3, 6, 7 and 9.

In addition to the above conditions (1) to (4), the following condition (5) may be added as necessary.

(5) The pitch $\tau_s$ of the pole teeth of the stator magnetic poles and the pitch $\tau_R$ of the pole teeth of the rotor should satisfy the following correlations.

$$\tau_s = 180\tau_R/(180 \pm \tau_R) \quad (3)$$

$$60/\tau_s = m \text{ (where } m = 1, 2, \ldots\text{)} \quad (4)$$

In more detail, the above equations (3) and (4) are derived as follows.

Since the pole tooth pitch $\tau_R$ is expressed as $\tau_R = 360/Z$, the following equation is obtained.

$$Z = 360/\tau_R \quad (5)$$

Since the stator pole tooth pitch $\tau_s$ is expressed as $\tau_s = 360/(Z \pm 2)$, the following equation is obtained.

$$Z = (360/\tau_s) \pm 2 \quad (6)$$

Solving the equations (5) and (6) for $\tau_s$ results in the following equation (3).

$$\tau_s = 180\tau_R/(180 \pm \tau_R) \quad (3)$$

Further, since the stator pole teeth must be aligned with the center of the magnetic poles, the following equation (4) is obtained.

$$60/\tau_s = m \text{(where } m = 1, 2, \ldots\text{)} \quad (4)$$

Explanation will next be made as to the first and third embodiments of the present invention shown in FIGS. 3A to 3C.

Figure 3A:
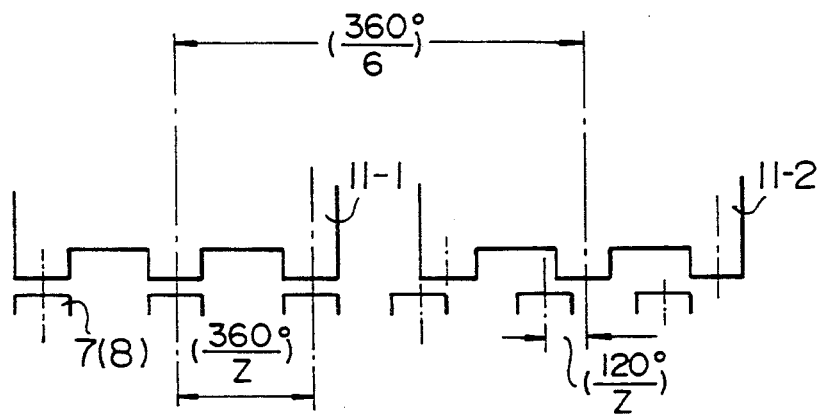
FIGS. 3A to 3C are developments showing relationships between stator magnetic poles and rotor magnetic poles in first to third embodiments of the present invention, respectively.

Shown in FIG. 3A is the first embodiment of the present invention in the form of a development showing relationship between the stator magnetic poles 11-1, 11-2 and the rotor magnetic pole 13, in which case the pitch of $\tau_g$ of the pole teeth of the rotor magnetic pole is to be set equal to the pitch $\tau_R$ of pole teeth of the rotor magnetic pole, and $Z = 6n - 4$.

Figure 3B:
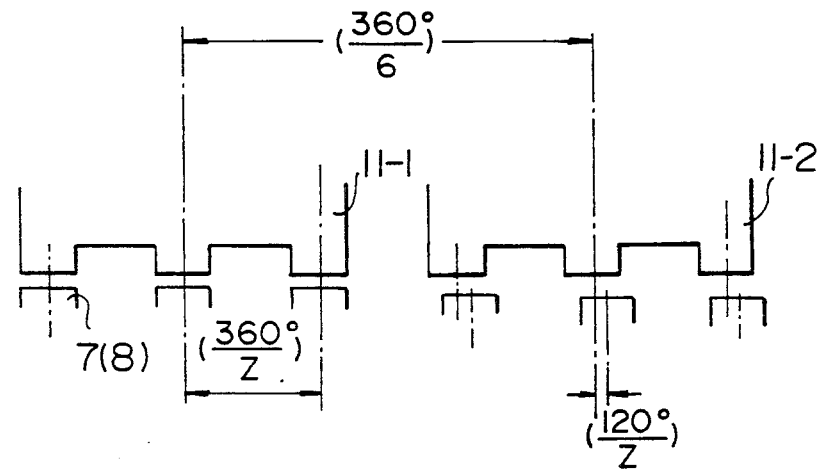

Shown in FIG. 3B is the second embodiment of the present invention in the form of a development showing relationships between the stator magnetic poles 11-1, 11-2 and the rotor magnetic pole 13, in which case the pitch $\tau_S$ of the pole teeth of the stator magnetic pole is set to be equal to the pitch $\tau_R$ of the pole teeth of the rotor of the magnetic pole, and an angle made between the stator magnetic pole and the opposing rotor magnetic pole is positioned on the right side of the center line of the stator magnetic pole in the development, and $Z = 6n + 4$.

Figure 3C:
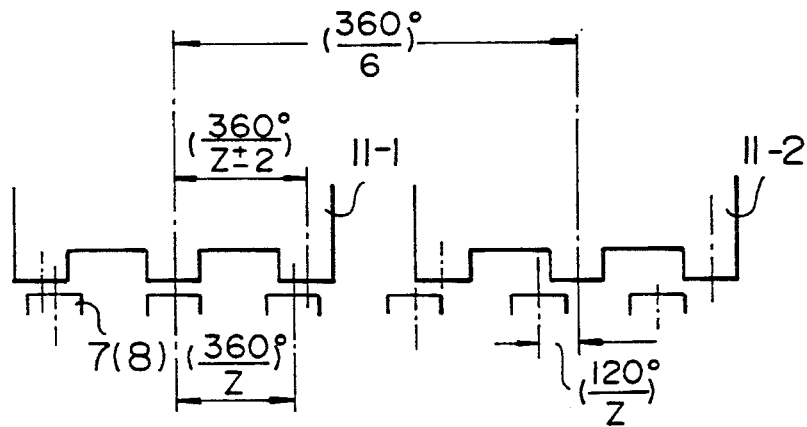

Shown in FIG. 3C is the third embodiment of the present invention in the form of a development showing relationships between stator magnetic poles 11-1, 11-2 and the rotor magnetic pole 13, in which case the pitch of the pole teeth of the stator magnetic poles as well as the pitch of the pole teeth of the rotor magnetic poles satisfy the above equations (3) and (4), and $Z = 6n - 4$.

FIG. 4 shows, in a development form, per each driving steps of one of the magnetic poles of the rotor magnetized as an N pole and the other magnetized as an S pole by the permanent magnet 9. In the drawing, for the purpose of indicating the extend to rotary shift of the rotor magnetic pole 7 in each step, one pole tooth thereof is denoted by dot mark ".".

Figure 5A:
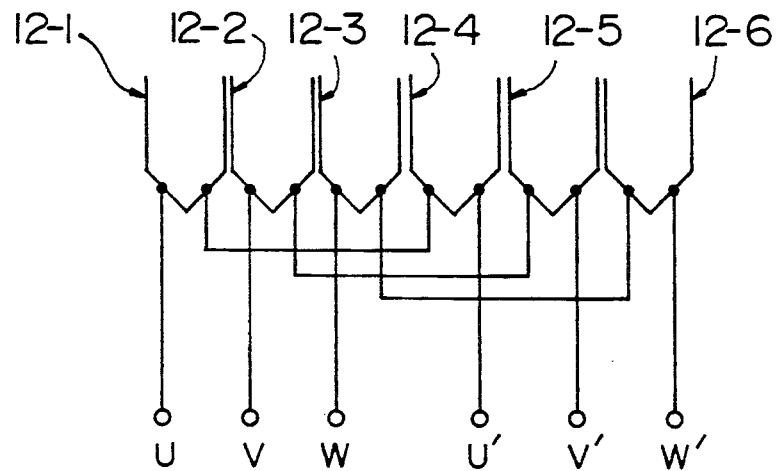
FIG. 5A is a wiring diagram of the stepping motor of the present invention having a monofilar winding and 6 lead wires.
Figure 5B:
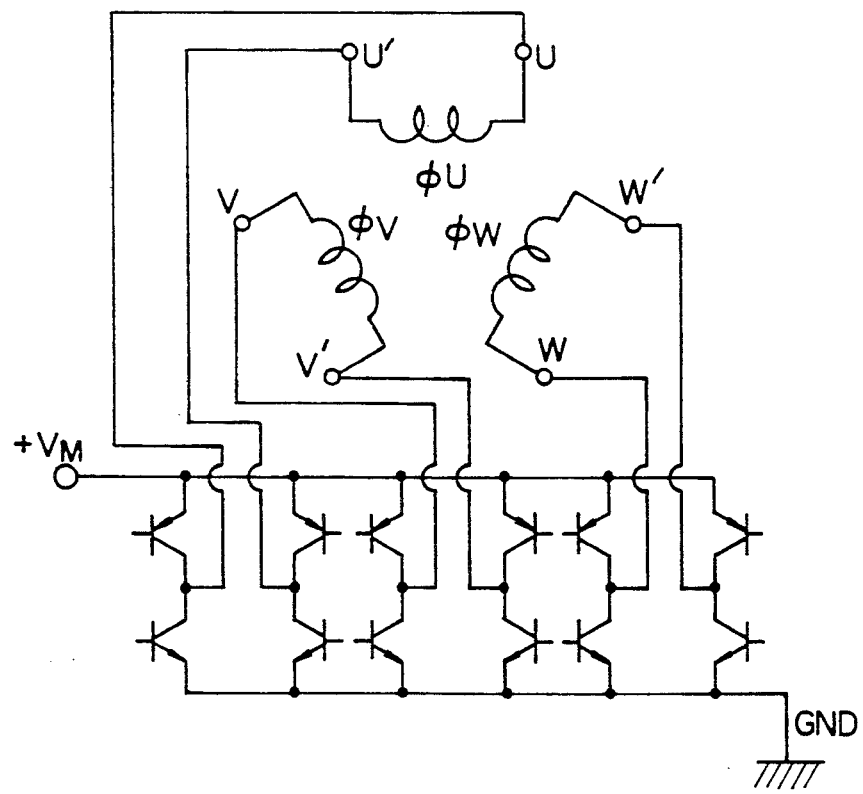
FIG. 5B is a wiring diagram of the motor when driven on a bipolar basis.

For simplifying the stepping operation of the motor, explanation will be made as to the case where the motor has the magnetic pole arrangement of FIG. 3A with 6 lead wires and with such a monofilar winding as shown in FIG. 5A for one-phase excitation is driven on a bipolar basis, by referring to FIG. 4.

First, when a current is passed through the windings of the magnetic poles 11-1 and 11-4 so that the magnetic poles 11-1 and 11-4 are magnetized to have respectively an S polarity, this causes the N-polarity magnetic pole 7 of the rotor to be attracted by the S-polarity magnetic poles 11-1 and 11-4 so that the pole teeth of the rotor are aligned with the corresponding magnetic poles (step 1).

When a current is next passed through the windings of the magnetic poles 11-2 and 11-5 so that the magnetic poles 11-2 and 11-5 are magnetized to have respectively an N polarity, this causes the S-polarity magnetic pole 8 of the rotor to be attracted by the N-polarity magnetic poles 11-2 and 11-5 so that the pole teeth of the rotor are aligned with the corresponding magnetic poles (step 2).

Next, when a current is passed through the windings of the magnetic poles 11-3 and 11-6 so that the magnetic poles 11-3 and 11-6 are magnetized to have respectively an S polarity, this causes the N-polarity magnetic pole 7 of the rotor to be attracted by the S-polarity magnetic poles 11-3 and 11-6 so that the pole teeth of the rotor are aligned with the corresponding magnetic poles (step 3).

Then, when a current is passed through the windings of the magnetic poles 11-1 and 11-4 so that the magnetic poles 11-1 and 11-4 are magnetized to have respectively an N polarity, this causes the S-polarity magnetic pole 8 of the rotor to be attracted by the N-polarity magnetic poles 11-1 and 11-4 so that the pole teeth of the rotor are aligned with the corresponding magnetic poles (step 4).

In this manner, the rotor is shifted by one pitch in a step 6. In this case, a movement angle (step angle) $\theta_s$ shifted in one step is $60°/Z$ that is determined by the number of teeth in the rotor. When the pitch angle between the adjacent magnetic poles of the rotor is denoted by $\theta_P$, the step angle $\theta_S$ is expressed as $\theta_P/6$. These Z, $\theta_P$ and $\theta_S$ are set according to such a table as shown in FIG. 6 with respect to the values of a parameter n which is also a parameter of Z. In FIG. 6, only one through 16 are shown as the values of n and the values of the step angle are expressed to four places of decimals for the convenience of explanation.

Figure 7A:
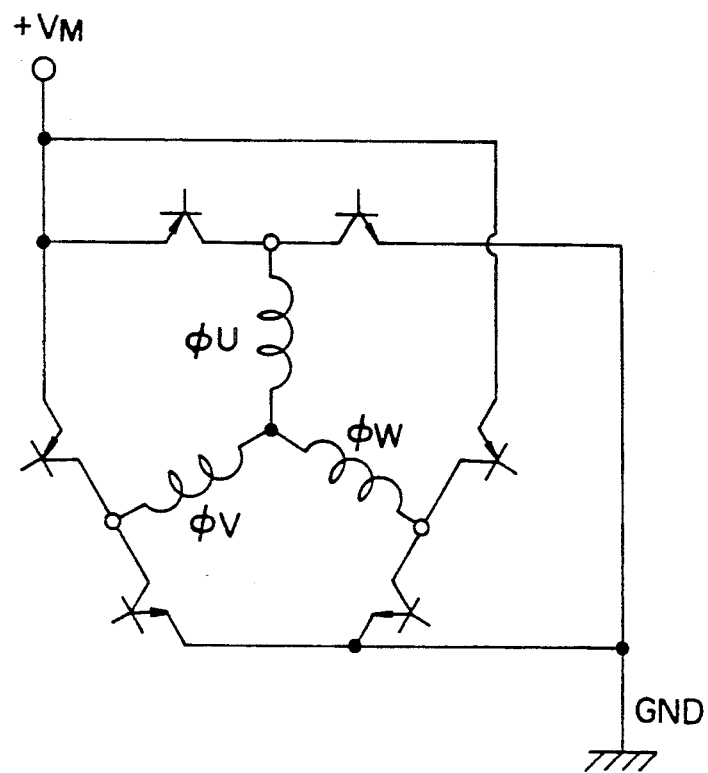
FIG. 7A and 7B are Y- and Δ(delta)-connections of stator windings respectively.
Figure 7B:
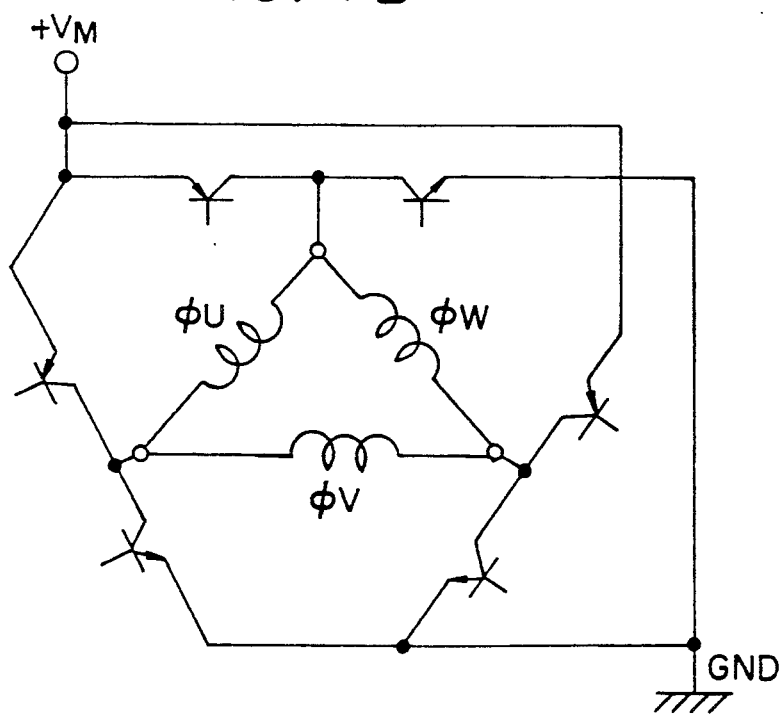
Figure 8A:
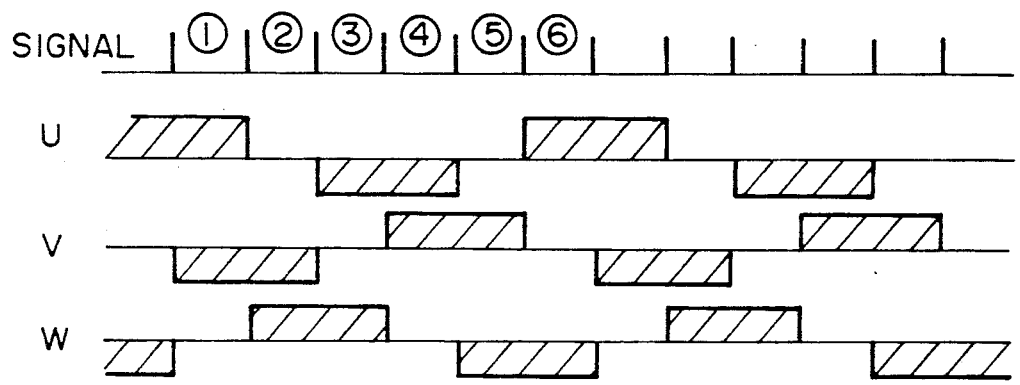
FIGS. 8A and 8B are waveform diagrams for explaining the exciting sequence of the stator windings in the Y- and Δ-connections respectively.
Figure 8B:
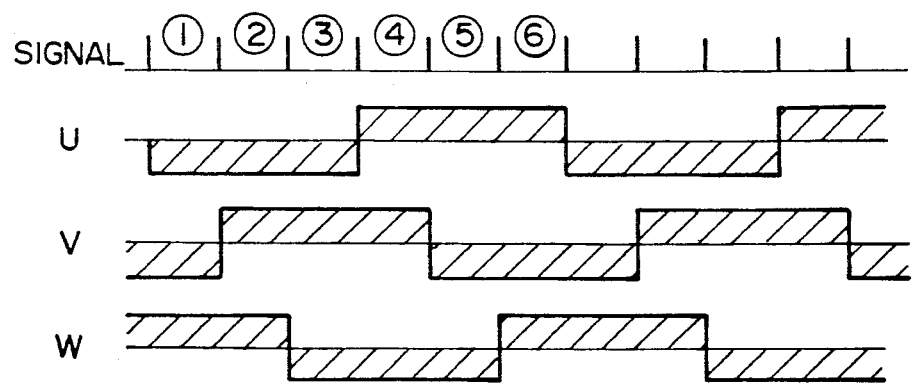
Figure 8C:
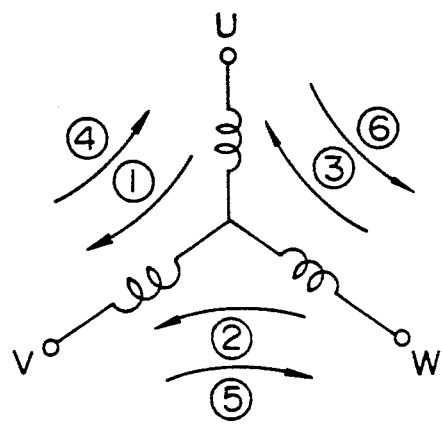
FIGS. 8C and 8D are diagrams for explaining how to switch 3-phase exciting power to be supplied to the stator windings in the Y- and Δ-connections respectively.
Figure 8D:
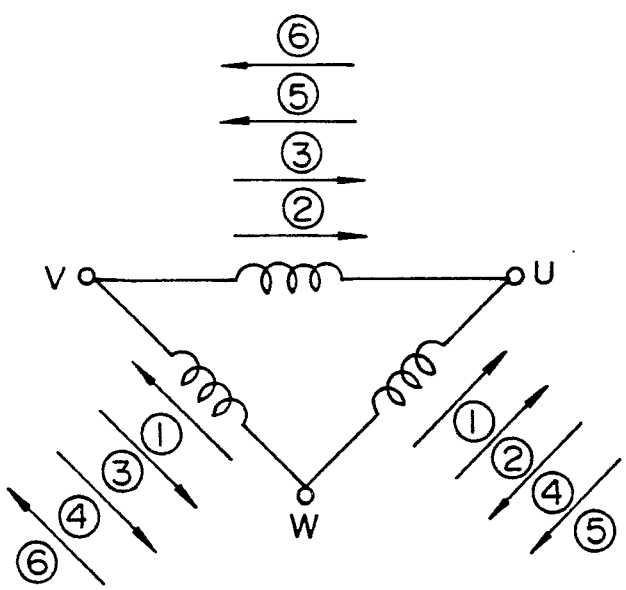
Figures 9A, 9B:
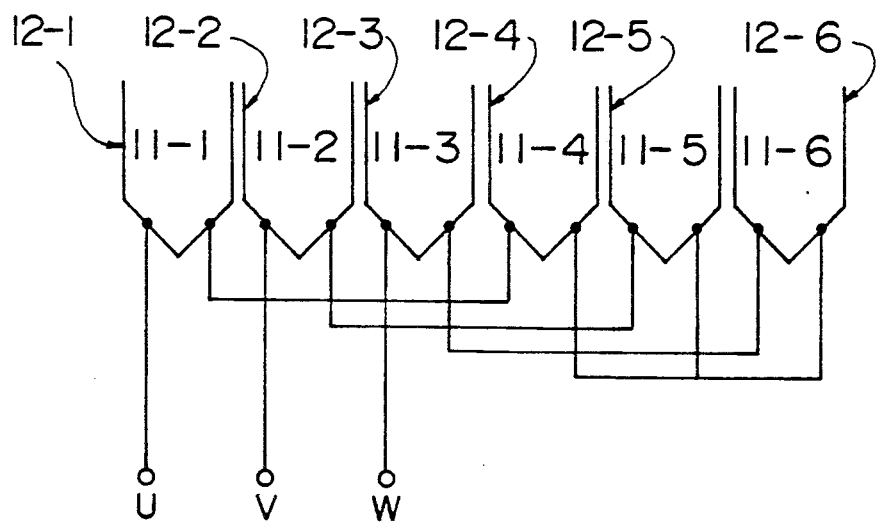
FIGS. 9A and 9C show transition of magnetic poles of the respective stator windings in the Y- and Δ-connections when the above switching is carried out respectively.
FIGS. 9B and 9D are different wiring diagrams having 3 lead wires respectively.
Figures 9C, 9D:
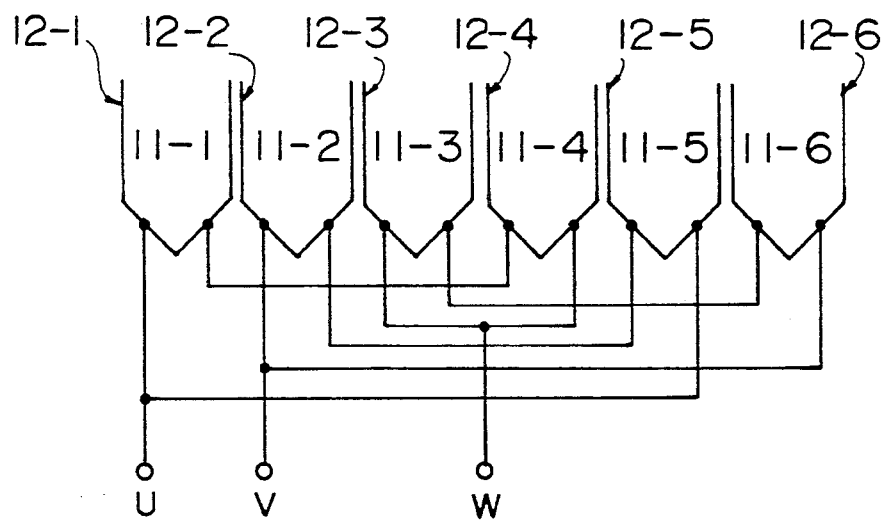

In operation of the stepping motor in accordance with the present invention, when such exciting sequences as shown in FIGS. 8A and 8B are given to the stator windings 12-1 to 12-6 in Y- and Δ-connections through three external lead wires as shown in FIGS. 7A and 7B to sequentially shift power supply as shown by ① to ⑥ in FIGS. 8C and 8D respectively, the windings 12-1 to 12-6 cause such changes in the polarity of the corresponding magnetic poles as shown in FIGS. 9A and 9C, whereby the stepping motor of the present invention is driven on a stepping basis with the step angle $\theta_S$ determined by the aforementioned conditional equations.

As already explained above, reference symobls 11-1 to 11-6 denote the stator magnetic poles around which the corresponding windings 12-1 to 12-6 are wound.

Figure 10:
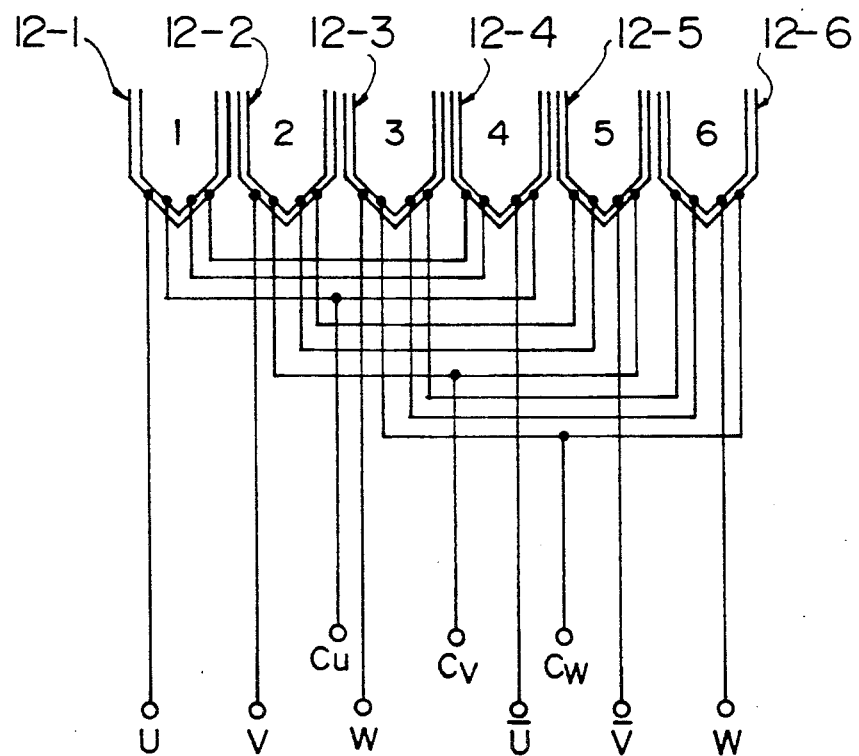
FIG. 10 is another wiring diagram having 9 lead wires.

Similarly, even when the monofilar (unifilar) winding is employed and the motor with 6 lead wires is driven on a bipolar basis as shown in FIG. 5A, or even when the bifilar winding is employed and the motor with 9 lead wires is driven on a unipolar basis as shown in FIG. 10 (or with 7 lead wires if center taps of the respective windings are all combined and used commonly as a single center tap), the motor may be driven stepwise with the step angle $\theta_S$ determined by the aforementioned conditional equations.

Therefore, the permanent magnet type stepping motor of the present invention can be driven in three sorts of driving systems by changing its winding method, that is, on a 3-lead-wire drive basis, a 6-lead-wire bipolar drive basis and on a 9-lead-wire (or 7-lead-wire, as mentioned above) unipolar drive basis.

It will be seen from FIG. 6, where n is set at 16 for example, even when the pole tooth number of the rotor magnetic poles is set at 100, the step angle is 0.6 degrees, which means that the stepping motor of the present invention can easily produce a very small angle rotation, when it is compared with the fact that, in the case of a 2-phase motor, the step angle of 0.6 degrees can be obtained only by setting the pole tooth number at 150.

Although the present invention has been explained in connection with the first embodiment in the foregoibng for the sake of convenience of explanation, the operation of the second and third embodiments is substantially the same as the former case.

As has been disclosed in the foregoing, a permanent magnet type stepping motor in accordance with the present invention is arranged so as to satisfy the aforementioned conditions. As a result, the present invention has the following excellent effects ① to ⑥ and thus can be suitably used in such various sorts of accurate office automation machines and apparatuses as printers, high-speed facsimile machines and copying machines of plain paper copier (PPC) type.

① A 2-phase motor requires 4 lead wires and 8 transistors in a driver circuit and a 5-phase motor requires 5 lead wires and 10 transistors in a driver circuit in the prior art; whereas the motor of the present invention can be driven on a 3-phase basis, in which case the motor of the present invention requires only 3 lead wires and 6 transistors in a driver circuit, thus resulting in that the configuration of the driver circuit can be simplified to a large extent with a low cost.

② The number of magnetic poles is at least 8 for the 2-phase type and at least 10 for the 5-phase type in the prior art; whereas only 6 magnetic poles are required in the present invention. As a result, a structure can be made simple and small in size and manufacturing steps can be simplified..

③ Torque ripple can be reduced to a half when compared with the prior art 2-phase motor and thus vibrations can be improved.

④ Since the stator magnetic poles are arranged symmetrical with respect to the axis of rotation so that core laminates can be stacked as shifted by, e.g., 90 degrees, each time the stacked core laminates to have a predetermined thickness in order to remove a core blanking error at the time of blanking core sheets, and thus a positional accuracy can be remarkably improved.

(5) Because the number of magnetic poles is as small as 6, the number of turns in the windings can be increased and therefore a torque can be increased by 30% or more when compared with that of the same type of the prior art motor.

(6) The invention can be used as a 3-phase A.C. motor by making the impedance of the windings large.

What is claimed is:

1. A permanent magnet type stepping motor comprising:

a stator having a plurality of radially-extended magnetic poles provided on its inner periphery, each of said plurality of magnetic poles being provided at its tip end with a plurality of pole teeth arranged as equally spaced by an identical pitch, said stator also having a plurality of windings wound around the plurality of corresponding magnetic poles, any of the two magnetic poles angularly shifted by 180 degrees having the same polarity;

a rotor having two rotor magnetic poles disposed to be concentric with said stator as spaced by a gap from inside the stator and also provided on their full circumferential peripheries with a plurality of pole teeth shifted by ½ pitch from each other and an axially-magnetized permanent magnet held between said rotor magnetic poles:

wherein the magnetic poles of said stator are set at 6 in number as arranged equally with an identical pitch, the pitch $\tau_S$ of the pole teeth provided at the tip ends of the respective magnetic poles of the stator is set to be equal to the pitch $\tau_R$ of the pole teeth of the rotor, an angle $\theta_r$ made between one of the pole teeth of the stator magnetic poles and one of the pole teeth of the rotor magnetic poles opposing thereto is set to satisfy a relationship $\theta_r = 120°/Z$, said pole tooth number Z of the rotor magnetic poles is set to satisfy a relationship $Z = 6n \pm 4$ (where n is a positive integer), and said motor is driven with one of 3, 6, 7 and 9 lead wires.

2. A permanent magnet type stepping motor comprising:

a stator having a plurality of radially-extended magnetic poles provided on its inner periphery, each of said plurality of magnetic poles being provided at its tip end with a plurality of pole teeth arranged as equally spaced by an identical pitch, said stator also having a plurality of windings wound around the plurality of corresponding magnetic poles, any of the two magnetic poles angularly shifted by 180 degrees having the same polarity;

a rotor having two rotor magnetic poles disposed to be concentric with said stator as spaced by a gap from inside the stator and also provided on their full cirumferential peripheries with a plurality of pole teeth shifted by ½ pitch from each other and an axially-magnetized permanent magnet held between said rotor magnetic poles;

wherein the magnetic poles of said stator are set at 6 in number as arranged equally with an identical pitch, the pitch $\tau_S$ of the pole teeth of said stator magnetic poles and the pitch $\tau_R$ of the pole teeth of said rotor magnetic poles satisfy correlations of $\tau_S = 180° \tau_R/(180° \pm \tau_R)$ and $60/\tau_S = m$ (where m is 1,2, ... ), an angle $\theta_r$ made between one of the pole teeth of the stator magnetic poles and one of the pole teeth of the rotor magnetic poles opposing thereto is set to satisfy a relationship $\theta_r = 120°/Z$, said pole tooth number Z of the rotor magnetic poles is set to satisfy a relationship $Z = 6n \pm 4$ (where n is a positive integer), and said motor is driven with one of 3, 6, 7 and 9 lead wires.

* * * * *

UNITED STATES PATENT AND TRADEMARK OFFICE
CERTIFICATE OF CORRECTION

PATENT NO. : 5,128,570

DATED : July 7, 1992

INVENTOR(S) : KOUKI ISOZAKI

It is certified that error appears in the above-identified patent and that said Letters Patent is hereby corrected as shown below:

Column 2, line 37, change "$T_S$" to --$\tau_S$--;

line 39, change "$T_R$" to --$\tau_R$--.

Column 4, line 1, before "The" insert --(2)--;

line 38, delete ")" (second occurrence).

Column 6, line 36, change "foregoibng" to --foregoing--.

Column 8, line 21, change "cirumferential" to --circumferential--.

Signed and Sealed this

Twenty-first Day of September, 1993

*Attest:*

BRUCE LEHMAN

*Attesting Officer*    *Commissioner of Patents and Trademarks*